United States Patent [19]

Voss

[11] 4,419,590
[45] Dec. 6, 1983

[54] SEQUENCER FOR PUMP MOTORS OR THE LIKE

[75] Inventor: Earl W. Voss, Colcord, Okla.

[73] Assignee: Diversified Electronics, Inc., Evansville, Ind.

[21] Appl. No.: 347,182

[22] Filed: Feb. 10, 1982

[51] Int. Cl.³ .............................................. H02J 1/00
[52] U.S. Cl. ..................................... 307/41; 307/118
[58] Field of Search .................... 307/31, 38, 41, 113, 307/115, 118; 318/102; 417/7, 8

[56] References Cited

U.S. PATENT DOCUMENTS

| | | | |
|---|---|---|---|
| 2,634,376 | 4/1953 | Eck | 307/41 |
| 3,489,882 | 1/1970 | Kraekow | 307/38 X |
| 3,854,055 | 12/1974 | Sparks | 307/115 |
| 4,015,138 | 3/1977 | Andrews et al. | 307/41 |
| 4,016,474 | 4/1977 | Mason | 307/41 X |
| 4,321,477 | 3/1982 | Bartlett | 307/41 X |
| 4,341,983 | 7/1982 | Gottliebson | 318/102 |

FOREIGN PATENT DOCUMENTS 2057207  3/1981  United Kingdom ................. 307/38

*Primary Examiner*—Michael L. Gellner
*Assistant Examiner*—Derek Jennings
*Attorney, Agent, or Firm*—Robert R. Keegan

[57] ABSTRACT

There is disclosed an electro-mechanical sequencer to equalize the running time of multiple (typically four) pumps in a common sump at a sewage treatment plant or the like. The sequencer includes a solid state binary counter receiving an input at an all-pumps-off condition. The binary counter operates a pair of multi-pole-double-throw relays. Control signals (typically four) from float valves or other sensing devices to the pump motors are routed through the first relay and then the second relay; one of the relays shifts the connection of its inputs and outputs by one position; the other relay shifts by two positions. Upon successive input signals to the binary counter the relays are changed from no-shift, to one position shift, two position shift, three position shift, and back to no-shift (in four pump systems). Three pump systems return to no-shift after the two position shift. Control signals through the relays do not pass through semiconductor devices and failure of sequencer operation leaves the pump system fully operative, but without the sequencing function.

12 Claims, 3 Drawing Figures

SEQUENCER FOR PUMP MOTORS OR THE LIKE

The present invention relates to sequencer apparatus for equalizing service times of multiple electric motors or other electrical load devices. A typical application for the sequencer apparatus is to equalize the running time and consequently the wear on each of three or four pumps installed in a common sump in a sewage treatment plant lift station. The invention will be described as applied to such use although it will be apparent that sequencer apparatus according to the invention may be useful in various other applications.

In a lift station for a sewage treatment plant it is desirable for several reasons that multiple pumps be installed rather than one large pump. With multiple pumps the failure of one pump will normally not cause failure of the treatment operation. One pump may be disabled for maintenance or repair without interrupting the operation. Also, normal operation will require only a portion of the pumps to be operating and all pumps will operate at the same time only in unusual conditions.

However, to obtain the full advantage of the fact that the pumps are rarely all in service, it is desirable to arrange that there is no one pump which goes into operation most frequently. This is the function performed by sequencer apparatus. A multiple pump lift station may include four pumps and four float switches, each one of the floats being activated at a different level. For convenience the float switches will be designated number one, number two, number three, and number four, and number one float switch will be the one which activates at the lowest liquid level and thus is the first switch to close and the switch which is closed at any time any of the other switches are closed.

If float switches number one, number two, number three and number four were connected respectively to pump motors number one, number two, number three, and number four, pump number one would be in service more than any of the other pumps and would incur more wear and thus be more likely to fail. Pump sequencer apparaus causes float switch number one to be connected to pump motor number one only part of the time. The sequencer apparatus periodically causes float switch number one to be connected to pump motors number two, number three, and number four so that the added duty time associated with the lowest float switch (number one) is shared by the various pumps and their motors. The sequencer apparatus also rotates or cycles the connection from float switches number two, three, and four to all four of the pump motors.

Sequencer apparatus for performing the above function has been previously known but the improved sequencer apparatus according to the present invention provides a fail-safe apparatus which, at the same time, is simple, inexpensive, and requires little attention or maintenance.

Prior sequencer apparatus utilized low voltage control signals to operate a multiplicity of relays and in the event of failure of any essential part of the sequencer apparatus, one or more of the pumps could be rendered inoperative. The sequencer apparatus according to the present invention in contrast employs only two multi-pole relays for switching float switch to pump motor connections and regardless of the nature of the failure of the sequencer apparatus the relays will be in a state in which each pump motor is connected to a respective float switch and will be fully operative. Naturally, if part of the sequencer apparatus fails the sequencing of the connections may no longer operate but this is not serious for a brief period of time necessary to replace or repair the sequencer apparatus. Thus the sequencer apparatus according to the present invention contributes significantly to the durability and reliability of the multi-pump installation, and at the same time it is virtually impossible that the lift station operation will be interrupted due to a failure of the sequencer apparatus.

In addition to providing the above described features and advantages it is an object of the present invention to provide a sequencer apparatus for multiple pump lift stations in which sequencing of the connection between float switches and pump motors is accomplished by two serially connected multi-pole-double-throw electromechanical relays connected to provide a a metallic conductor path from each float switch to a respective pump motor regardless of the on or off condition of either of the two relays.

It is another object of the present invention to provide a sequencer apparatus in which a pair of multi-pole-double-throw relays are connected respectively to the two outputs of a binary counter whereby up to four different connections between control signal sources and electrical loads will be sequentially switched by the outputs of the binary counter.

It is still another object of the present invention to provide sequencer apparatus for sequencing the connections between control signal sources and electrical loads wherein three pole relays are serially connected and operated by the two outputs of a binary counter to switch the connections between the signal sources and the electrical loads in a three-step cycle.

Other objects and advantages of the present invention will be apparent from consideration of the following description in conjunction with the appended drawings in which.

Figure 1:
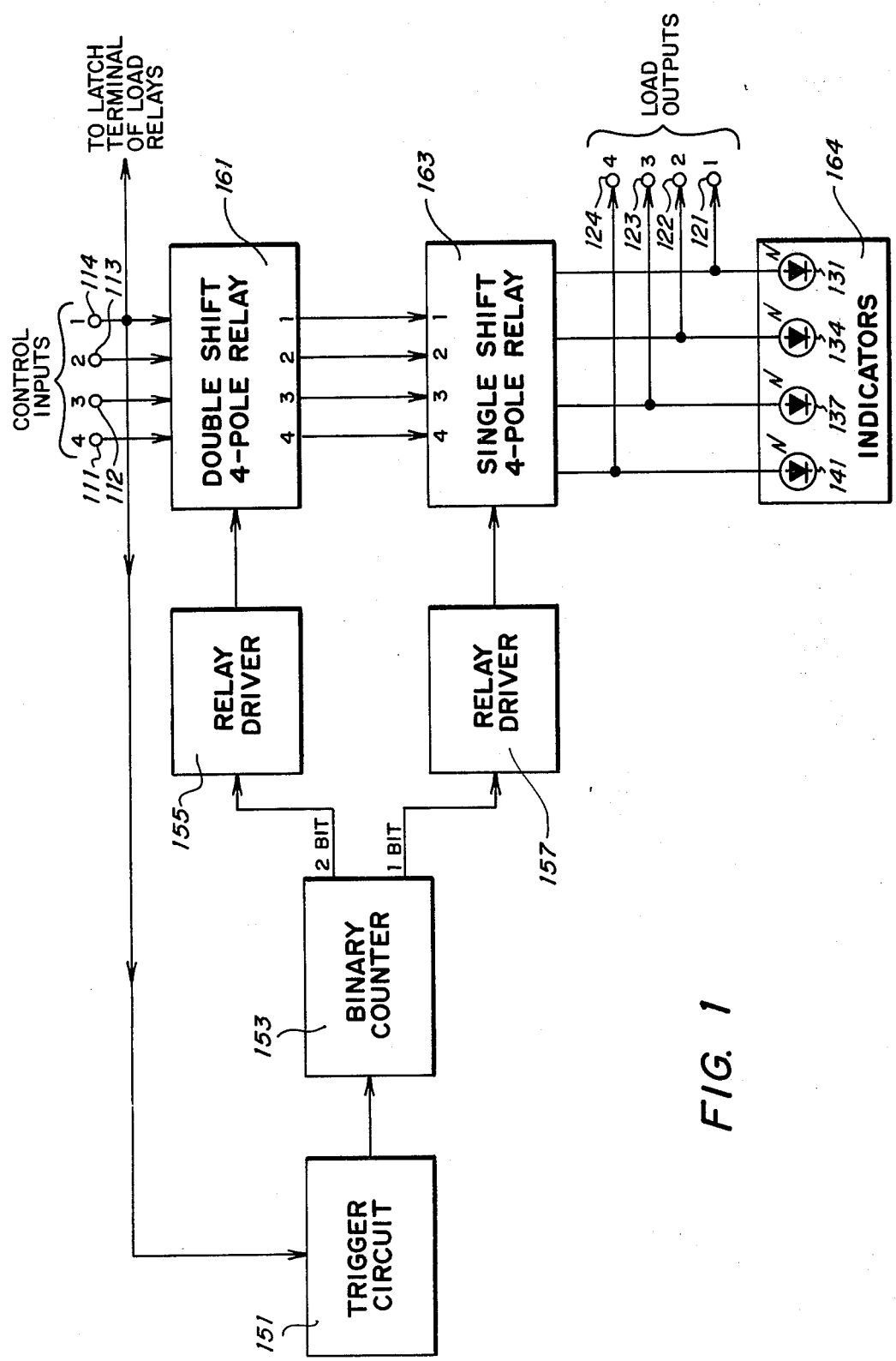
FIG. 1 is a schematic block diagram of pump sequencer apparatus according to the present invention.

Referring now to the drawings and particularly to FIG. 1, sequencer apparatus according to the invention includes a trigger circuit 151 connected to the input of a binary counter 153. The binary counter 153 has two outputs labelled "1 bit" and "2 bit". The operation of the binary counter 153 is such that for every trigger signal received from trigger circuit 151 it raises by one the count stored in its transistor logic through a range of zero to three. Thus the outputs from the binary counter 153 cycle through both off, 1 bit on, 2 bit on, both on, and back to both off.

A pair of relay drivers 157 and 155 are connected to receive the 1 bit and the 2 bit outputs from binary counter 153, respectively. A double shift four pole relay 161 is driven by relay driver 155 and a single shift four pole relay 163 is driven by relay driver 157. Double shift four pole relay 161 has terminals 111, 112, 113, and 114 for control inputs four, three, two, and one, respectively. Outputs four, three, two, and one of double shift four pole relay 161 are connected to corresponding inputs of single shift four pole relay 163. Relay 163 has output terminals 124, 123, 122, and 121, for the connection of loads four, three, two, and one, respectively.

If both outputs of binary counter 153 are off then neither relay 161 or relay 163 are activated and each of the control inputs one, two, three, and four, will be connected by a metallic conductor path to corresponding load output terminals one, two, three and four. It may be noted that this is also the default condition of the sequencer apparatus since in the absence of power to relays 161 and 163 they will be spring loaded to this off position. In a typical arrangement trigger circuit 155 has an input which is connected to terminal 114 which receives control input one. Trigger circuit 151 produces an output to binary counter 153 when the control signal at terminal 114 goes off.

Terminal 114 may be connected to a latch terminal of each of the four load relays controlling power to the pump motors. The load relays (not shown in FIG. 1) are latching relays arranged so that a pump motor turns on in response to a float switch. That pump motor stays on even though the float switch subsequently opens, so long as a signal is present at the latch terminal. The signal at the latch terminal may alternatively be provided by a fifth, lowest level float switch and float switch one may be shunted by latch relay contacts. This produces an operation of the multiple pump apparatus such that additional pumps are turned on as the liquid level rises to actuate additional float switches, but once turned on the pump motors do not turn off until the liquid level has been reduced below the lowest control point. This arrangement assures that periodically the liquid level will be lowered to the point where all pumps will be off. The all pumps off condition is utilized to operate trigger circuit 151 by connecting it to terminal 114 to detect the all pumps off condition. With this arrangement, relays 161 and 163 are operated with no control signals through their contacts.

Indicator apparatus 164 with indicators 131, 134, 137, and 141 indicates the condition of output control signals from single shift four pole relay 163 so that operating personnel can observe that the sequencing of the pump motors or other loads is taking place. As previously explained, the start-up condition of the sequencing apparatus will cause control inputs one, two, three and four to be directed respectively to load outputs one, two, three, and four. This will be true whether any of the control inputs are on or not. The first operation of trigger circuit 151 will take place when number one float switch turns off causing the input at terminal 114 to go off (along with all other inputs if the system incorporates latching load relays as previously described). When the signal at terminal 114 goes off trigger circuit 151 pulses binary counter 153 causing the output of the binary counter to go to 1 bit on and 2 bit off. This causes relay driver 157 to actuate single shift four pole relay 163, which is internally wired to shift the positions of its inputs with respect to its outputs by one position upon actuation of the relay. That is, when relay 163 is actuated its input one is connected to output two, input two is connected to output three, input three is connected to output four, and input four is connected to output one. Since double shift four pole relay 161 is not affected by the on signal at the 1 bit output of binary counter 153, a total shift of one position is produced between control input terminals 111, 112, 113, and 114, and load output terminals 124, 123, 122, and 121.

If successive float switches two, three, and four go on, no change is produced in the sequencer. However, when the liquid level is reduced to the point that float switch number one opens and turns off the input at terminal 114, trigger circuit 151 is again operated to pulse binary counter 153 and its output changes to 1 bit off and 2 bit on. Single shift four pole relay 163 is no longer actuated by relay driver 157 and double shift four pole relay 161 is actuated by relay driver 155. Double shift four pole relay 161 is internally wired to produce a two position shift between its inputs and outputs upon actuation of the relay. When actuated, relay 161 causes connection from input one to output three, from input two to output four, from input three to output one, and from input four to output two. Thus, on the second actuation of trigger circuit 151 only double shift four pole relay 161 is actuated and the relation of the control inputs to the load outputs is shifted by two positions.

On the third cut-off of float switch one causing actuation of trigger circulit 151, binary counter 153 turns on both the 1 bit and the 2 bit, and relay drivers 155 and 157 actuate both relays 161 and 163. In this condition double shift relay 161 shifts the position relation by two positions and single shift relay 163 shifts the relation by an additional position so that the total shift is three positions.

Upon the fourth actuation of trigger circuit 151, binary counter 153 returns to the state where both bit 1 and bit 2 are off, both relays are off, and there is no shift in relation between control inputs and load outputs.

Obviously, the pump motor or other load which is connected to float switch or other control input number one will come into service first and experience the greatest duty time. The load connected to control input four will experience the least service and the least duty time. As seen from FIG. 1 the sequencer apparatus according to the invention periodically changes the relationship between the inputs from control apparatus (such as float switches) relative to the outputs to load devices (such as pump motors) so that the duty time and service of the load devices tends to be equalized.

In this respect the function of the apparatus of the invention is similar to previous sequencer apparatus. The apparatus of the invention is, however, simpler and more reliable than previously known apparatus. For example, multi-contact arrangements driven by stepping motors are known which would perform the function of a sequencer apparatus as described, but stepping motor switching arrangements are expensive and complicated and do not provide the reliability provided by apparatus according to the present invention. Other prior sequencer apparatus employing electronic logic to operate multi-pole relays has also been far more complicated than apparatus according to the present invention and was subject to failure modes in which one or more of the pump motors would be disabled thus presenting the possibility of partial or complete failure of the multi-pump system attributable to loss of power or other disability in the sequencer apparatus. This cannot occur in apparatus according to the present invention as will be appreciated from the previous explanation relating to FIG. 1.

If power fails for the sequencer apparatus of FIG. 1, relay drivers 155 and 157 will be inoperative and relays 161 and 163 will not be actuated. This will leave the relationship between control inputs and load outputs in the zero shift condition but all pumps will operate in response to corresponding float switches. Of course there will be no sequencing while the apparatus is disabled. Even if the sequencer apparatus is disabled in some other mode leaving one or both of the relays 161 and 163 permanently operative, the pump motors or loads will be respectively connected to particular ones of the float switches and the pump system will be fully operative as to all four pump motors.

Figure 2:
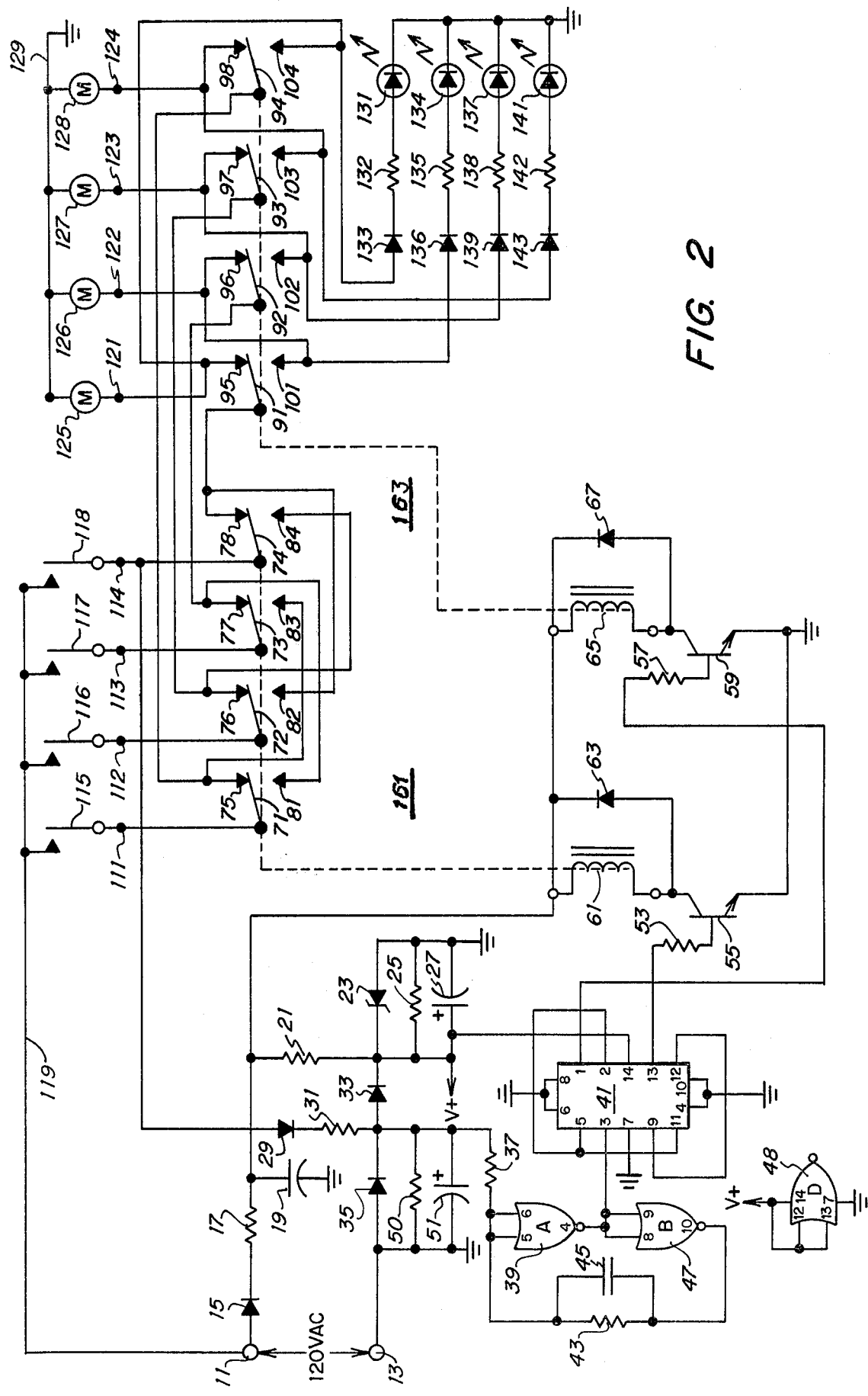
FIG. 2 is a circuit diagram of the apparatus of FIG. 1.

FIG. 2 shows a schematic circuit diagram of sequencer apparatus according to the invention for sequencing four loads which corresponds generally to the block diagram of FIG. 1. The sequencer apparatus is connected to a 120 volt AC power supply at terminals 11 and 13. Diode 15, resistor 17, capacitor 19, resistor 21, zener diode 23, resistor 25, and capacitor 27, are connected as shown between terminal 11 and ground to form a DC voltage supply circuit. The DC voltage is determined by zener diode 23 and may, for example, be 12 volts.

The 120 volt AC supply voltage may also conveniently be used as the control signals produced by switches 115, 116, 117, and 118, which act as control signal sources; for the purpose of illustration switches 115, 116, 117, and 118 may be considered to be float switches responding to liquid level in the sump of a lift station for a sewage treatment plant. Switches 115 through 118 are connected respectively to terminals 111 through 114 which are the control input terminals of the sequencer apparatus.

As previously explained, the number one control signal to terminal 114 is the signal chosen to operate the sequencer apparatus. When this signal goes off, the sequencer operates to change the sequence of the relation between the control input terminals and the load output terminals.

Blocking diodes 33 and 35 are connected in series between grounded terminal 13 and the +12 volt power supply. The junction of diodes 33 and 35 is connected through resistor 31 and diode 29 to control input terminal 114. At start-up of the apparatus or as soon as switch 118 is closed after start-up, a 120 volt signal rectified by diode 29 and applied at the junction of diodes 33 and 35 causes the DC voltage at this junction to be slightly more than 12 volts (approximately 12.7 volts due to the voltage drop across diode 33).

Nor gate 39 is a section of a quad two-input nor gate such as Motorola Type No. MC14001. Both its inputs are connected through resistor 37 to the junction of diodes 33 and 35 so that pins five and six of the IC go high causing the nor gate output at pin four to go low. A second section of the IC is nor gate 37 having its inputs (pins eight and nine) connected to the output of nor gate 39. The output of nor gate 47 is connected back to the input of nor gate 39 through a parallel RC circuit consisting of resistor 43 and capacitor 45. The initially low output of nor gate 39 is connected to an input at pin three of flip-flop IC 41. IC 41 is a dual type D flip-flop such as Motorola Type No. MC14013.

Certain pins of IC 41 are interconnected to cause it to operate as a two-digit binary counter, the outputs of which are from pins one and thirteen leading through resistor 57 to the base of transistor 59 and through resistor 53 to the base of transistor 55, respectively. IC 41 is triggered only on the positive going edge of a clock pulse applied to pin three and thus in the initial condition both transistors 55 and 59 will be off.

Interconnection of nor gates 39 and 47 through resistor 43 and capacitor 45 form a schmidt trigger circuit which produces a fast rise time pulse at the output of nor gate 39 (connected to the clock input at pin three of IC 41). The feedback circuit of nor gates 39 and 47 also provides a degree of noise immunity due to the hysteresis effect between the signal at the input and output of nor gate 39. In the event of noise in the circuit or switch bounce, this prevents the generation of two rapid pulses at the clock input of IC 41 which would create a skipped step in the sequence of the sequencer apparatus.

When switch 1118 opens, the voltage at the junction of diodes 33 and 35 will fall to zero because of the discharging effect of a resistor 50 on a capacitor 51, both of which are parallel with diode 35. When the dropping voltage reaches the lower threshold of nor gate 39, the output of nor gate 39 will switch high causing the pin three input of IC 41 to go high. When this clock input to IC 41 goes high it causes the bit one output at pin one to go high. This turns on transistor 59 and energizes relay coil 65. Relay coil 65 will be alternately turned on and then off with successive positive going clock pulses applied to pin three of IC 41.

As previously mentioned, IC 41 is connected as a binary counter by connecting pin two to pins five and eleven, and pin twelve to pin nine. The binary output is produced from pins one and thirteen; that is, pin one is alternately turned on and then off with successive positive going clock pulses applied to pin three of IC 41 and pin thirteen is alternately turned on then off with successive off signals at pin one (corresponding to on signals at pin two).

Since relay coils 65 and 61 are controlled by the pin one and pin thirteen outputs of IC 41, the relays 163 and 161 will also follow a binary pattern of operation (as explained in the discussion of FIG. 1). The movable or armature contacts of relay 161 numbered 71, 72, 73, and 74, are connected respectively to control signal input terminals 111, 112, 113, and 114. The normally closed contacts of relay 61 numbered 75, 76, 77, and 78, are connected to the armature contacts 94, 93, 92, and 91, respectively, of relay 163. Normally open contacts 81, 82, 83, and 84, of relay 161 are connected respectively to the armature contacts of relay 163, numbered 92, 91, 94, and 93. Thus it will be seen that as the armature contacts of relay 161 change from the normally closed contacts to the normally open contacts, the connections to the respective armatures of relay 163 are shifted by two positions.

The normally closed contacts of relay 163, numbered 95, 96, 97, and 98, are connected to load output terminals 121, 122, 123, and 124. A motor 125 is connected to receive current from terminal 121 and also connected to ground conductor 129. Motors 126, 127, and 128 are similarly connected with respect to terminals 122, 123, and 124. While the motors 125 through 128 are shown receiving current directly from terminals 121 through 124, in many cases the terminals 121 through 124 will supply current to a motor controller or motor relay which opens and closes (possibly higher voltage and/or polyphase) current contacts supplying motors 125 through 218. Also, the motors 125 through 128 may have latching relays which are latched by a signal from terminal 114 as explained with reference to FIG. 1. These variations in the setup of the sequencing operation are not material to the present invention and the sequencer apparatus according to the invention will operate with any such variations of multiple motor configurations.

Relay 163 has its normally open contacts 101, 102, 103, and 104, connected respectively to terminals 122, 123, 124, and 121. Thus, when the armatures of relay 163 switch from the normally closed contacts to the normally open contacts, a shift of one position is imparted in the relationship between the armatures of relay 163, numbered 91, 92, 93, and 94, and the terminals of relay 163, numbered 121, 122, 123, and 124. Thus (as explained with reference to FIG. 1) relay 163 is a single position shifting relay which operates in conjunction with double position shifting relay 161 to provide sequentially shifts of zero positions, one position, two positions, three positions, and back to zero positions.

Indicator LEDs 131, 134, 137, and 141, are connected respectively to terminals 121, 122, 123, and 124, through appropriate resistors 132, 135, 138, and 142, and diodes 133, 136, 139, and 143. Thus LEDs 131, 134, 137, and 141 indicate which loads 125, 126, 127, and 128, are supplied with power at any given moment; when one, two or three of the LEDs are on one may observe the sequence which is in effect and as the sequence changes from time to time one may confirm that the sequencer apparatus is operating. It should be noted that the MC14001 quad two input nor gate utilized in the circuit of FIG. 2 provides four nor gates. The circuit of FIG. 2 requires only two nor gates, 39 and 47, and as will be seen the circuit of FIG. 3 requires an additional nor gate 49. Nor gate 48 is not required in either circuit and should be connected as shown in FIG. 2 so that it has no floating inputs which would adversely affect the operation of the circuit. In the case of the circuit of FIG. 2 nor gate 49 (not shown) should also have its inputs connected to the positive supply voltage in a manner similar to that shown for nor gate 48.

Figure 3:
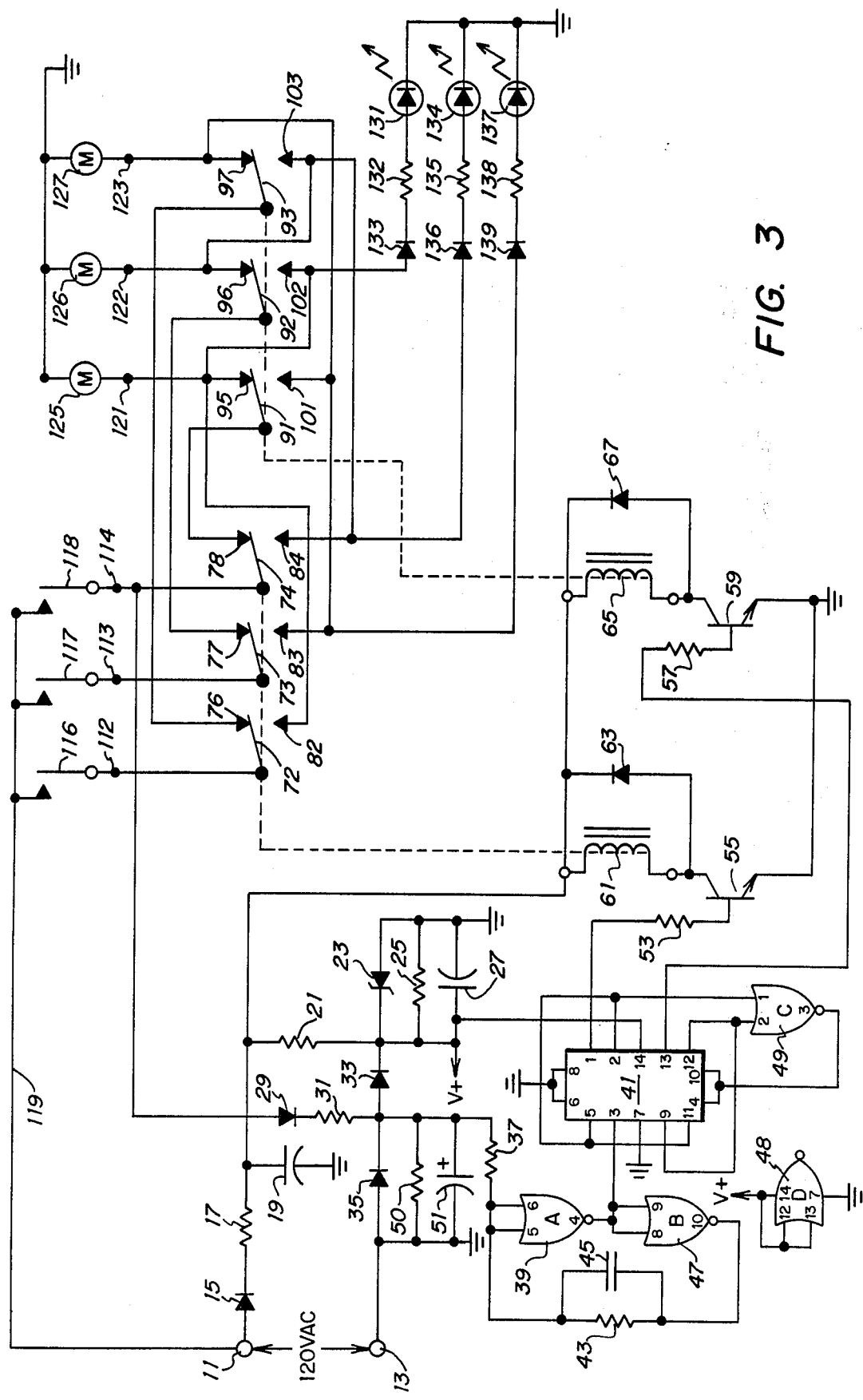
FIG. 3 is a circuit diagram of an alternative apparatus for sequencing only three loads.

Referring now to FIG. 3, there is shown an alternative circuit for sequencer apparatus adapted for use with only three pump motors or other loads. Circuit elements in FIG. 3 which are the same as in FIG. 4 have been given the same reference number. As might be expected, the circuit of FIG. 3 is generally quite similar to that of FIG. 2 and consequently only those differences in the circuit construction and operation as compared with FIG. 2 will be described in detail. It will first be noted that relays 161 and 163 are three pole relays rather than four pole relays. For convenience of explanation switch 115, terminal 111, and contacts 71, 75, and 81, have been eliminated in FIG. 3 as compared with FIG. 2. Motor 128, terminal 124, contacts 94, 98, and 104 in relay 163, have been omitted also. Relay 161 may still be considered to be a double shift relay, but since there are only three sets of contacts a double shift in one direction is equivalent to a single shift in the other direction. It should also be noted that with only three steps in the sequence there will be no need for a three position shift corresponding to having the 1 bit output and the 2 bit output both on. Thus in FIG. 3 three normally open contacts 82, 83, and 84 are not connected to armature contacts of relay 163, but are connected directly to outputs of relay 163 at terminals 121, 123, and 122. It will be noted therefor that the FIG. 3 circuit is arranged to provide metallic conductor paths through the relays from the terminals 112, 113, and 114, to the terminals 121, 133, and 123, for every possible condition of operation or non-operation of relays 161 and 163, including the situation in which both relays are operated. The condition of both relays operated would only occur in the event of a malfunction of the sequencer circuit. Thus the FIG. 3 circuit has the previously described fail-safe feature which prevents the malfunction or disability of the sequencer apparatus from disabling the response of any of the motors to some one of the switches 116 through 118.

The circuit of FIG. 3 is modified to eliminate a binary three output from the binary counter IC 41; nor gate 49 is connected with one input from pin two of IC 41 and one input from pin twelve of IC 41. Nor gate 49 thus detects a binary three output from IC 41 and instantly resets the IC to zero output by virtue of the connection of the output of nor gate 49 to pins four and ten of IC 41. The block diagram of FIG. 1 is not intended to be an accurate representation of the function of FIG. 3 since it shows four control inputs and four load outputs rather than the three shown in FIG. 3. Another difference in FIG. 3 is that the control signals are routed through the double shift relay and through the single shift relay in serial fashion only when the double shift relay is not activated. When double shift relay 161 is activated it is connected to by-pass single shift relay 163 and connected directly to output terminals 121, 122, and 123.

Functionally the operation of the sequencer apparatus of FIG. 3 is similar to the operation of the apparatus of FIGS. 1 and 2 previously described, except that there are only three steps in the sequencer rather than four. The FIG. 3 circuit is also similar in that it is fail-safe against malfunction of the logic elements controlling the relays 161 and 163. While the circuits of FIGS. 2 and 3 are shown as separate and distinct, due to their similarities it is possible to install switches in the circuit of FIG. 2 that would make it convertible to a three-load sequencer by operation of one or more multi-pole switches that would in effect change it to the circuit of FIG. 3 (nor gate 49 is required).

While sequencer apparatus in accordance with the invention could be designed for five or more load devices, there does not appear to be a significant requirement for such apparatus. Greater number of loads could, of course, be accommodated by increasing the digital logic circuit from two digits to three digits, or more, and increasing the number of relays in a corresponding manner. The number of poles on the relays would also have to be increased to accommodate additional loads.

Exemplary values for the circuit components in FIGS. 2 and 3 are shown in TABLE I below.

TABLE I

| Capacitors | Microfarads |
|---|---|
| 19 | 5 |
| 27 | 3.3 |
| 45 | .01 |
| 51 | 1 |

| Resistors | K-OHMs or Other |
|---|---|
| 17 | .33 |
| 21 | 22 |
| 25 | 4.7 |
| 37 | 47 |
| 43 | 470 |
| 53, 57 | 15 |
| 132, 135, 138, 142 | 22 |

| Transistors | Designation No. |
|---|---|
| 55, 59 | MPS-A42 |

| Diodes | Designation No. |
|---|---|
| 23 | Zener, 12V, 1w. |
| 15, 29, 63, 67, 133, 136, 139, 143 | 4007 |
| 33, 35 | 914 |

While specific circuits have been shown in FIGS. 2 and 3 for the purpose of illustration and explanation, it will be understood that numerous variations in the circuits may be made within the scope of the invention. For example, in FIG. 2 the control signals are routed first through the double shift four pole relay 161 and then through the single shift four pole relay 163. The control signals could equally well be first routed through the single shift relay and then routed through the double shift relay. The arrangement of the relays in FIG. 3 could also be reversed. For the specific multiple pump application described it is convenient to use the number one control signal (off-state) to trigger the sequencer; in general, any signal may trigger the sequencer which occurs at appropriate intervals of from several minutes to a day or more; the signal may be one which occurs somewhat randomly or one which occurs regularly as from a timer or clock. It may also be noted that since the conductive paths through relays 161 and 163 are entirely metallic conductor paths which are bidirectional the sequencer of FIG. 2 or of FIG. 3 would operate if the load outputs were exchanged with the control inputs. As is generally the case with apparatus involving digital logic circuits, numerous other known substitutions of logic elements might be employed while maintaining the overall function and advantages of the invention disclosed herein.

From the foregoing explanation and discussion it will be seen that sequencer apparatus as disclosed herein provides a remarkably simple and inexpensive apparatus for providing a sequencing operation for multiple pump motors or other load devices. Furthermore, the apparatus is arranged to employ electro-mechanical relays in a manner such that whatever a failure mode of the binary logic control circuit elements might be, the relays will provide a metallic conductive path for control current to each of the motors or other loads from a respective control input terminal.

In addition to the variations and modifications to the apparatus which have been shown or suggested, other variations and modifications will be apparent to those skilled in the art and accordingly the scope of the invention is not to be deemed limited to the embodiments shown or suggested, but is rather to be determined by reference to the appended claims.

What is claimed is:

1. Sequencer apparatus for equalizing service times of multiple electrical load devices controlled to turn on one by one in response to demand for service and having at least three electrical loads and a corresponding number of control signal sources, comprising
    a first relay having at least three pairs of fixed contacts and three armature contacts,
    a second relay having at least three pairs of fixed contacts and three armature contacts,
    said first relay having its normally closed fixed contacts connected to armature contacts of said second relay and its normally open fixed contacts differently connected to contacts of said second relay,
    a first set of at least three control signal terminals,
    said second relay having its normally closed fixed contacts connected one by one to respective ones of said first set of control signal terminals and its normally open fixed contacts differently connected to respective ones of said first set of control signal terminals,
    a second set of at least three control signal terminals connected one by one to the armature contacts of said first relay,
    a binary counter with at least one input and two outputs, said two outputs being connected respectively to operate said first relay and said second relay, and
    a sequencing signal source with an output connected to the input of said binary counter,
    whereby load devices may be connected to one of said sets of control signal terminals and control signal sources may be connected to the other of said sets of control signal terminals causing the sequencing of operation of said load devices to change in response to said sequencing signal source.

2. Apparatus as recited in claim 1 wherein said sequencing signal source has an input connected to one of said control signal terminals.

3. Apparatus as recited in claim 1 wherein one of said first and second relays has a first pair of contacts, a second pair of contacts and a third pair of contacts with the normally open contact of said first pair of contacts and the normally closed contact of said second pair of contacts connected to a common point and with the normally closed contact of said second pair of contacts and the normally open contact of said third pair of contacts connected to a common point.

4. Sequencer apparatus for equalizing service times of multiple electrical load devices controlled to turn on one by one in response to demand to service and having at least three electrical loads and a corresponding number of control signal sources, comprising
    a first electromechanical relay having at least three pairs of fixed double-throw contacts and three armature contacts,
    a first driver circuit connected to drive said first electromechanical relay,
    a second electromechanical relay having at least three pairs of fixed double-throw contacts and three armature contacts,
    a second driver circuit connected to drive said second electromechanical relay,
    said first electromechanical relay having its normally closed double-throw contacts connected one by one to armature contacts of said second electromechanical relay and its normally open double-throw contacts connected one by one to different contacts of said second electromechanical relay,
    a first set of at least three control signal terminals,
    said second electromechanical relay having its normally closed double-throw contacts connected one by one to respective ones of said first set of control signal terminals and its normally open double-throw contacts connected one by one to different ones of said first set of control signal terminals,
    a second set of at least three control signal terminals connected one by one to the armature contacts of said first electromechanical relay,
    a solid-state binary counter with at least one input and two outputs, said two outputs being connected respectively to said first driver circuit and said second drive circuit, and
    a sequencing signal source connected to the input of said binary counter,
    whereby load devices may be connected to one of said sets of control signal terminals and control signal sources may be connected to the other of said sets of control signal terminals causing the sequencing of operation of said load devices to change in response to said sequencing signal source.

5. Apparatus as recited in claim 4 wherein each of said electromechanical relays has four pairs of fixed double-throw contacts and four armature contacts, said first set of control signal terminals comprises four control signal terminals and said second set of control signal terminals comprises four control signal terminals.

6. Apparatus as recited in claim 5 wherein said sequencing signal source has an input connected to one of said control signal terminals.

7. Apparatus as recited in claim 5 wherein one of said first and second relays has a first pair of contacts and a second pair of fixed contacts with the normally open contact of said first pair of contacts and the normally closed contact of said second pair of contacts connected to a common point and the normally closed contact of said first pair of contacts and the normally open contact of said second pair of contacts connected to a common point.

8. Sequencer apparatus for equalizing service times of multiple electrical load devices controlled to turn on one by one in response to demand for service and having at least three electrical loads and a corresponding number of control signal sources, comprising
- a first electromechanical relay having first, second, third, and fourth pairs of double-throw contacts and four armature contacts,
- a first driver circuit connected to drive said first electromechanical relay,
- a second electromechanical relay having four pairs of double-throw contacts and first, second, third, and fourth armature contacts,
- a second driver circuit connected to drive said second electromechanical relay,
- said first electromechanical relay having its first, second, third, and fourth normally closed double-throw contacts connected respectively to said first, second, third, and fourth armature contacts of said second electromechanical relay and its first, second, third, and fourth normally open double-throw contacts connected respectively to third, fourth, first and second armature contacts of said second electromechanical relay,
- a first set of four control signal terminals,
- said second electromechanical relay having its normally closed double-throw contacts connected one by one to respective ones of said first set of control signal terminals and its normally open double-throw contacts connected one by one to different ones of said first set of control signal terminals,
- a second set of four control signal terminals connected one by one to the armature contacts of said first electromechanical relay,
- a solid-state binary counter with at least one input and two outputs, said two outputs being connected respectively to said first driver circuit and said second driver circuit, and
- a sequencing signal source connected to the input of said binary counter, whereby load devices may be connected to one of said sets of control signal terminals and control signal sources may be connected to the other of said sets of control signal terminals causing the sequencing of operation of said load devices to change in response to said sequencing signal source.

9. Apparatus as recited in claim 8 wherein said sequencing signal source has an input connected to one of said control signal terminals.

10. Sequencer apparatus for equalizing service times of multiple electrical load devices controlled to turn on one by one in response to demand for service and having at least three electrical loads and a corresponding number of control signal sources, comprising,
- a first electromechanical relay having three pairs of fixed double-throw contacts and three armature contacts,
- a first driver circuit connected to drive said first electromechanical relay,
- a second electromechanical relay having three pairs of fixed double-throw contacts and three armature contacts,
- a second driver circuit connected to drive said second electromechanical relay,
- said first electromechanical relay having its normally closed double-throw contacts connected one by one to armature contacts of said second electromechanical relay,
- a first set of three control signal terminals,
- said second electromechanical relay having its normally closed double-throw contacts connected one by one to respective ones of said first set of control signal terminals and its normally open double-throw contacts connected one by one to different ones of said first set of control signal terminals,
- a second set of three control signal terminals connected one by one to the armature contacts of said first electromechanical relay,
- a solid-state binary counter with at least one input and two outputs, said two outputs being connected respectively to said first driver circuit and said second driver circuit, and
- a sequencing signal source connected to the input of said binary counter, whereby load devices may be connected to one of said sets of control signal terminals and control signal sources may be connected to the other of said sets of control signal terminals causing the sequencing of operation of said load devices to change in response to said sequencing signal source.

11. Apparatus as recited in claim 10 wherein said sequencing signal source has an input connected to one of said control signal terminals.

12. Apparatus as recited in claim 10 wherein said second relay has a first pair of contacts, a second pair of contacts, and a third pair of contacts with the normally open contact of said first pair of contacts and the normally closed contact of said second pair of contacts connected to a common point and with the normally closed contact of said second pair of contacts and the normally open contact of said third pair of contacts connected to a common point.

* * * * *